(12) United States Patent
Yang

(10) Patent No.: US 7,701,729 B2
(45) Date of Patent: Apr. 20, 2010

(54) ELECTRIC SUPPLYING CARD HOLDER

(75) Inventor: Szu-Nan Yang, Taipei (TW)

(73) Assignees: Prologium Technology, Co., Ltd, Taipei County (TW); Ming Yu Innovation, Co., Ltd, Taipei (TW)

( * ) Notice: Subject to any disclaimer, the term of this patent is extended or adjusted under 35 U.S.C. 154(b) by 21 days.

(21) Appl. No.: 12/104,058

(22) Filed: Apr. 16, 2008

(65) Prior Publication Data
US 2008/0259578 A1 Oct. 23, 2008

(30) Foreign Application Priority Data
Apr. 20, 2007 (TW) .............................. 96114131 A

(51) Int. Cl.
*H05K 7/02* (2006.01)
(52) U.S. Cl. .................. 361/807; 429/27; 429/127; 429/152
(58) Field of Classification Search ................ 361/807, 361/681–687, 804; 429/27, 127, 152
See application file for complete search history.

(56) References Cited

U.S. PATENT DOCUMENTS

| | | | |
|---|---|---|---|
| 6,049,813 A * | 4/2000 | Danielson et al. ............ 708/100 |
| 6,392,881 B1 * | 5/2002 | Saitoh ......................... 361/686 |
| 6,632,538 B1 * | 10/2003 | Yamazaki et al. ............ 428/461 |
| 6,788,532 B2 * | 9/2004 | Yang et al. ................... 361/685 |
| 7,006,851 B2 * | 2/2006 | Holmes et al. ............ 455/569.2 |
| 7,242,383 B2 * | 7/2007 | Zavracky et al. ............ 345/102 |
| 7,281,944 B2 * | 10/2007 | Ito et al. ...................... 439/500 |
| 2005/0263596 A1 * | 12/2005 | Nelson et al. ................ 235/441 |
| 2006/0019151 A1 * | 1/2006 | Imachi et al. ................ 429/128 |
| 2006/0071633 A1 * | 4/2006 | Kubotera et al. ............ 320/112 |
| 2006/0206246 A1 * | 9/2006 | Walker ......................... 701/16 |
| 2006/0250110 A1 * | 11/2006 | Yanagida et al. ............ 320/114 |
| 2007/0096688 A1 * | 5/2007 | Suzuki et al. ................ 320/112 |

* cited by examiner

Primary Examiner—Jinhee J Lee
Assistant Examiner—Xiaoliang Chen
(74) Attorney, Agent, or Firm—Muncy, Geissler, Olds & Lowe, PLLC

(57) ABSTRACT

An electric supplying holder includes a first cover, a second cover, a flexible battery unit and a third cover. The second cover has at least one first contact point. The first cover is disposed at a first side of the second cover. The flexible battery unit has at least one conducting part and is placed between the first cover and the second cover. The first contact point is electrically connected with the conducting part. The third cover is disposed at a second side of the second cover, and a first accommodating space is formed between the second cover and the third cover.

12 Claims, 4 Drawing Sheets

ELECTRIC SUPPLYING CARD HOLDER

CROSS REFERENCE TO RELATED APPLICATIONS

This Non-provisional application claims priority under 35 U.S.C. §119(a) on Patent Application No(s). 096114131 filed in Taiwan, Republic of China on Apr. 20, 2007, the entire contents of which are hereby incorporated by reference.

BACKGROUND OF THE INVENTION

1. Field of Invention

The invention relates to a card holder with the electric supplying function.

2. Related Art

Recently, the radio frequency identification (RFID) technology is gradually developed. The RFID system has the non-contact property, wide-directional property, long lifetime and strong weather-resistant property, so the application fields thereof are getting wider and wider. For example, the RFID system may be applied to an identification card for entrance security control, a stored-value card for a metro system, or tickets for various games.

The RFID system may be divided into a reader and a tag. The tag may be applied in the form of a card, and does not have any electric power stored. Thus, the tag is induced by an electromagnetic wave signal, which is outputted by the reader, to generate the electric power and thus transfer the stored information back to the reader. Then, the reader generates the identification function. The RFID system serving as the identification card or the stored-value card mainly utilizes the low frequency band. Thus, the effective distance from the card to the reader is shorter (usually shorter than 1 meter). That is, the card cannot work with the reader if they are too far away from each other or the card is not located within the transmission range of the electromagnetic wave signal of the reader, and the function of the card is thus limited.

In addition, if the RFID system is applied to the stored-value card, the card serving as the RFID tag does not have the displaying function. If the residual value of the card has to be inspected, the reader has to be provided to read the card and display the residual value of the card. Thus, the convenience in use is deteriorated, and the user may have risks in using the card because he or she does not know the residual value of the card.

Therefore, it is an important subject to design an additional part to enhance the convenience of using the RFID card.

SUMMARY OF THE INVENTION

In view of the foregoing, the invention is to provide a holder having electric supplying and displaying functions and capable of accommodating a data card.

To achieve the above, the invention discloses an electric supplying holder including a first cover, a second cover, a flexible battery unit and a third cover. The second cover has at least one first contact point, and the first cover is disposed at a first side of the second cover. The flexible battery unit has at least one conducting part, and the flexible battery unit is placed between the first cover and the second cover. The first contact point is electrically connected with the conducting part. The third cover is disposed at a second side of the second cover, and a first accommodating space is formed between the second cover and the third cover.

As mentioned hereinabove, the electric supplying holder according to the invention combines a holder for accommodating a data card with a flexible battery unit, so that the data card can obtain the electric power via the flexible battery unit electrically connected therewith. Thus, the data card can be converted from the passive information transmission (i.e., the data card has to be powered by a reader) into the active information transmission, and the sufficient electric power can lengthen the effective distance of the data card. Compared with the prior art, when the data card is placed in the electric supplying holder of the invention, the flexible battery unit can supply the electric power to the data card so that the effective distance of the data card can be lengthened. Therefore, the user does not have to move the data card to approach the reader purposely for the identification by the reader, and the data card can be conveniently used.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
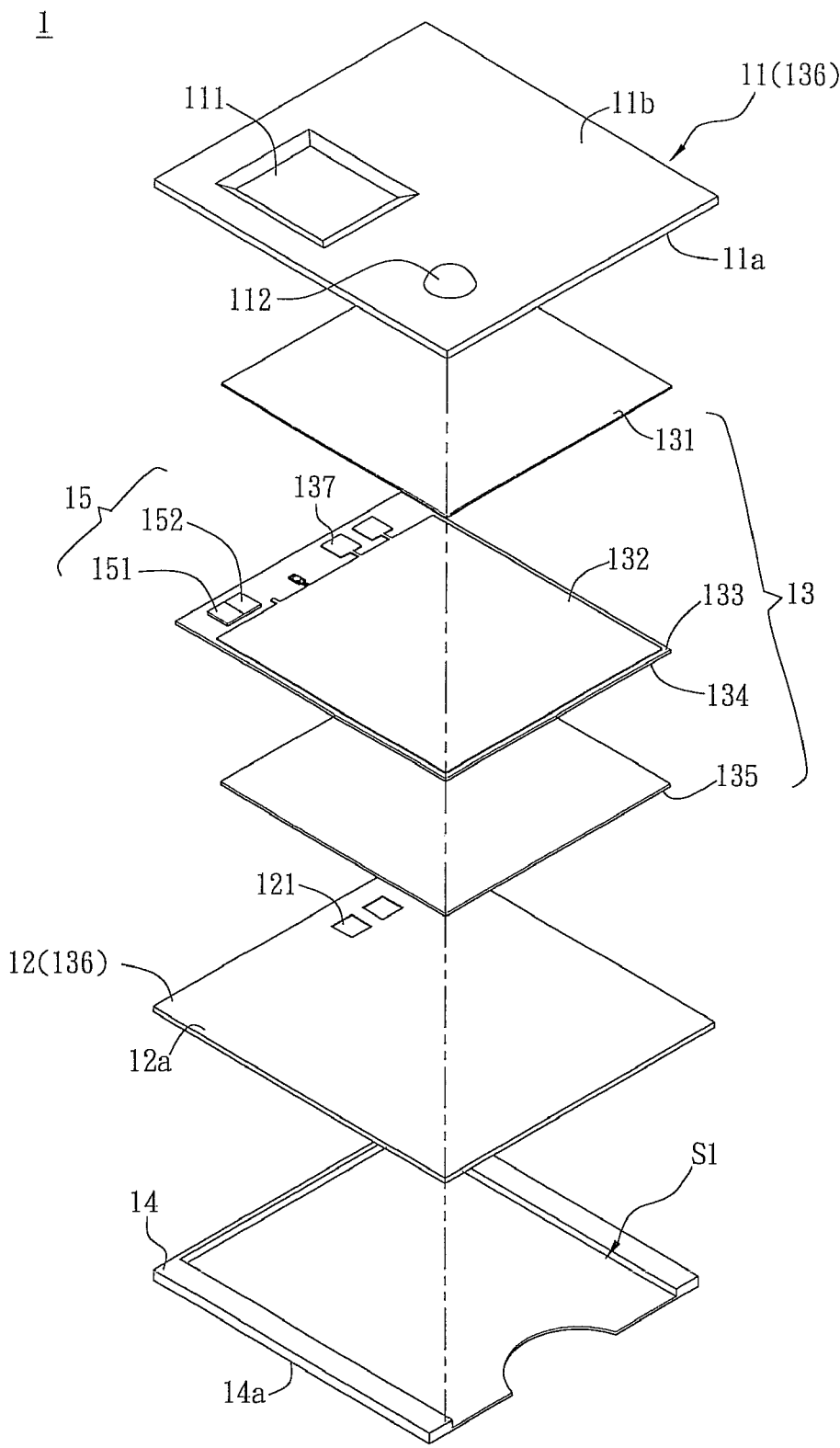
FIG. 1 is an exploded view showing an electric supplying holder according to the invention.

Referring to FIG. 1, an electric supplying holder 1 according to the preferred embodiment of the invention includes a first cover 11, a second cover 12, a flexible battery unit 13 and a third cover 14. The first cover 11 is disposed at one side of the second cover 12, the third cover 14 is disposed at the other side of the second cover 12, and the flexible battery unit 13 is placed between the first cover 11 and the second cover 12. An accommodating space S1 is formed between the second cover 12 and the third cover 14. In order to enhance the utility of the invention, each of the first cover 11, the second cover 12 and the third cover 14 is made of a flexible material, so the entire electric supplying holder is flexible.

The flexible battery unit 13 has a first charge collecting layer 131, a first active material layer 132, an isolation layer 133, a second active material layer 134 and a second charge collecting layer 135, all of which are sequentially disposed between the first cover 11 and the second cover 12. In addition, the first charge collecting layer 131 may also be directly disposed on a first surface 11a of the first cover 11, and the second charge collecting layer 135 is directly disposed on a third surface 12a of the second cover 12. That is, the first cover 11 and the second cover 12 may serve as a package element 136 for the flexible battery unit 13 and thus constitute a package structure of the flexible battery unit 13. The flexible battery unit 13 has two conducting parts 137, which are further electrically connected with two first contact points 121 of the second cover 12. In addition, the second cover 12 may also be formed with two holes to expose the conducting parts 137 of the flexible battery unit 13.

In addition, a display element 111 and a control button 112 may further be placed on a second surface 11b of the first cover 11 opposite to the first surface 11a in this embodiment. The display element 111 includes, for example but not limited to, a liquid crystal display (LCD), a light-emitting diode (LED) panel or an organic light emitting diode (OLED) panel. The display element 111 and the control button 112 may also be disposed on an outer surface 14a of the third cover 14 at positions, which are preferentially considered according to the convenience in use. In addition, the display element 111 and the control button 112 are respectively electrically connected with the conducting parts 137 of the flexible battery unit 13, so the display element 111 may be powered by the electric power provided by the flexible battery unit 13 to display information, and the control button 112 can control the electric power. It is to be noted that the display element 111 and the control button 112 may be formed along with the manufacturing processes of the first cover 11 or the third cover 14. That is, the first cover 11 or the third cover 14 has a composite-layer structure. For example, the composite-layer structure includes a control circuit layer, two electrode layers and a liquid crystal material layer to constitute the liquid crystal display. In addition, the display element 111 and the control button 112 may also be individual components, and are assembled to the first cover 11 or the third cover 14 after the first cover 11 or the third cover 14 is manufactured.

Moreover, the electric supplying holder 1 of this embodiment may further include a wireless charging module 15, which has an antenna unit 151 and a charge control unit 152. The wireless charging module 15 is disposed on the flexible battery unit 13 and is electrically connected with the flexible battery unit 13. The charge control unit 152 is a wireless battery charger chip.

Figure 2:
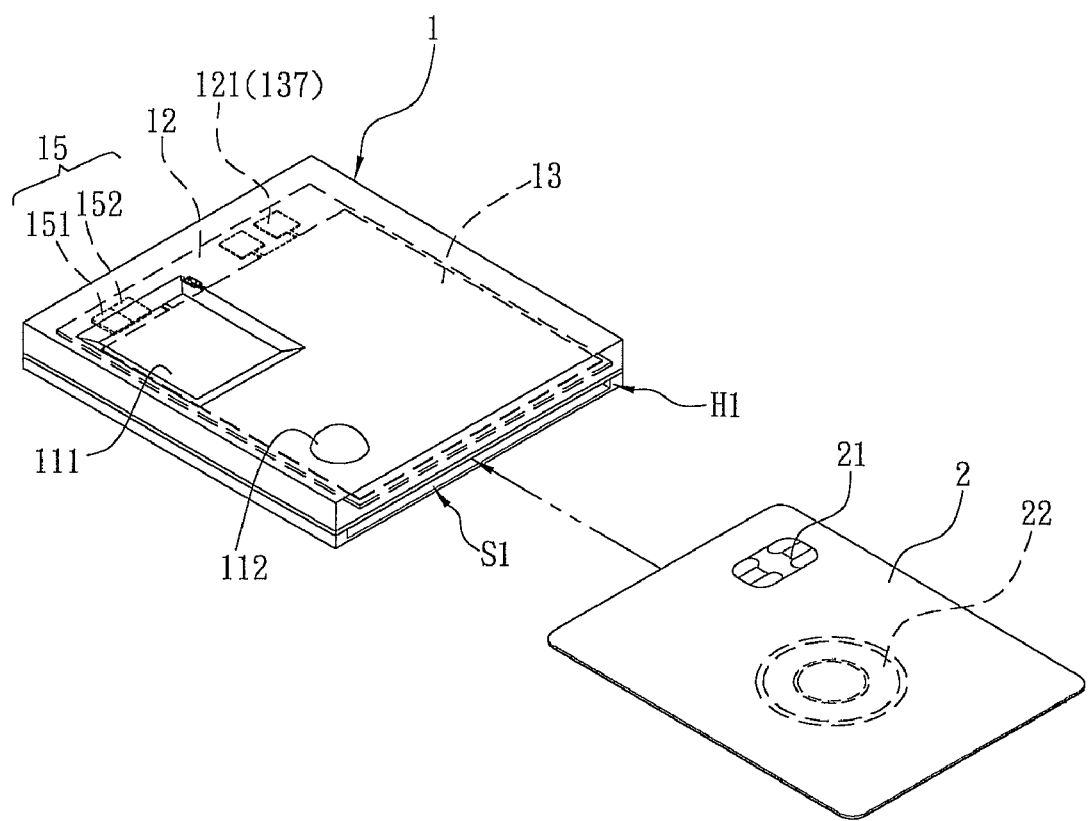
FIG. 2 shows the electric supplying holder of the invention used in conjunction with a data card.

FIG. 2 shows the electric supplying holder 1 of the invention used in conjunction with a data card 2, such as a radio frequency identification (RFID) element.

Referring to FIG. 2, the data card 2 may pass through a hole H1 of the electric supplying holder 1 and thus be disposed in the accommodating space S1. After the data card 2 is disposed in the accommodating space S1, many second contact points 21 of the data card 2 are electrically connected with the first contact point 121 of the second cover 12 in the electric supplying holder 1. The electrical connection between the first contact point 121 and the conducting part 137 of the flexible battery unit 13 makes the data card 2 be electrically connected with the flexible battery unit 13. Thus, the flexible battery unit 13 can provide the electric power to the data card 2.

Meanwhile, in order to prevent the data card 2 from being electrically connected with the flexible battery unit 13 continuously and thus to reduce the electric power consumption of the flexible battery unit 13, a control button 112 can be provided to control the electrical connection between the data card 2 and the flexible battery unit 13. When the data card 2 is electrically connected with the flexible battery unit 13, the flexible battery unit 13 may also provide a portion of the electric power to the display element 111 so that the display element 111 displays the information stored in the data card 2. Therefore, it is also possible to use the control button 112 to control the display element 111 to display the information or not.

In addition to supplying the electric power, the flexible battery unit 13 may also be self-charged according to three manners. In the first manner, as shown in this embodiment, the wireless charging module 15 is disposed on and electrically connected with the flexible battery unit 13. After the antenna unit 151 of the wireless charging module 15 receives an electromagnetic wave signal transmitted from a reader (not shown), the charge control unit 152 can supply the electric power to the data card 2 and to charge the flexible battery unit 13 simultaneously.

In the second manner, an antenna unit (not shown) is additionally disposed on the flexible battery unit 13. Therefore, the flexible battery unit 13 itself can be self-charged using the antenna unit to receive the electromagnetic wave signal outputted from the reader (not shown) regardless of the provision of the data card 2 or not.

In the third manner, when the data card 2 is disposed in the accommodating space S1, an antenna unit 22 of the data card 2 receives the electromagnetic wave signal transmitted from the reader (not shown), and then supplies a portion of the electric power for the data card 2 and the other portion of the electric power to charge the flexible battery unit 13.

Figure 3:
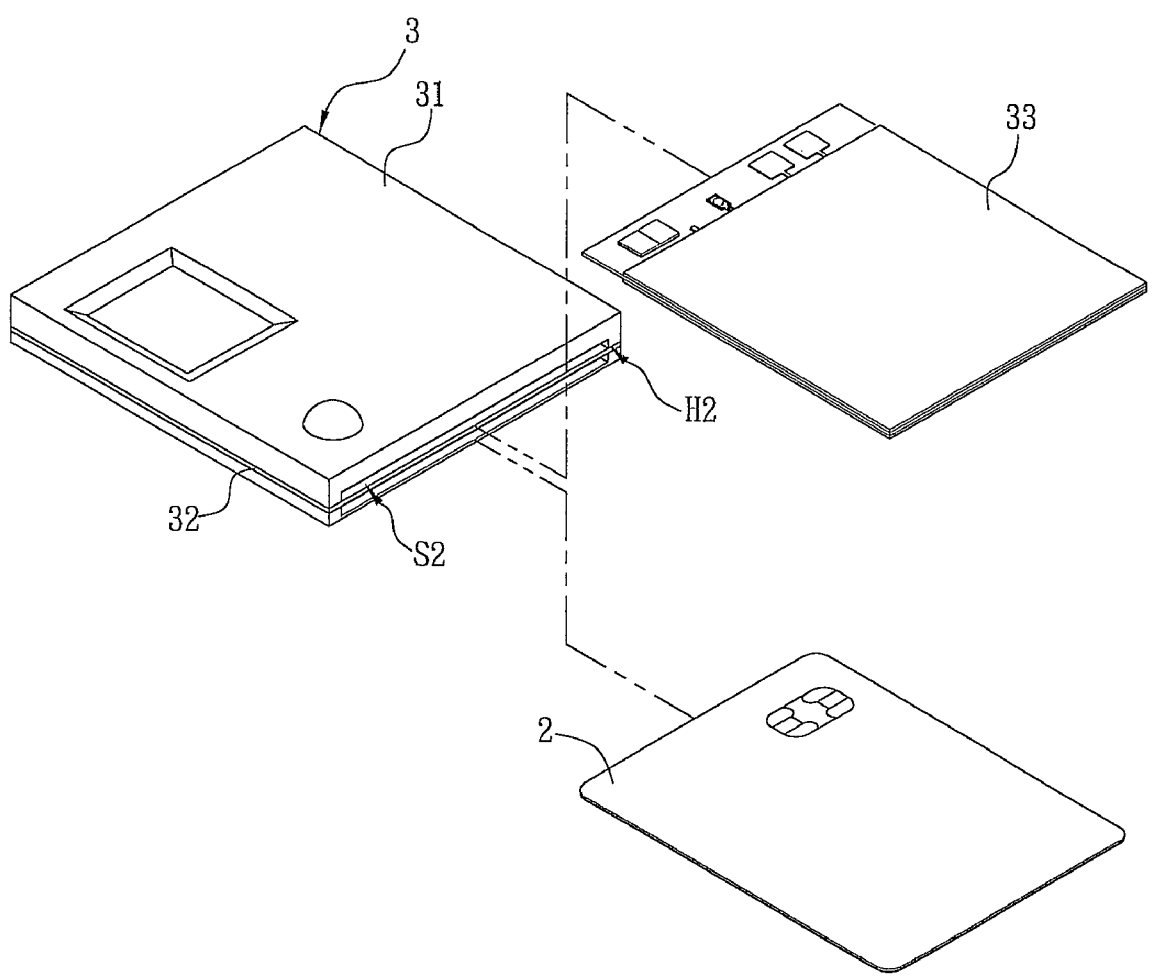
FIG. 3 shows an electric supplying holder according to another embodiment of the invention.

FIG. 3 shows an electric supplying holder 3 according to another embodiment of the invention. As shown in FIG. 3, the difference between this embodiment and the above-mentioned embodiment of FIG. 2 is that a flexible battery unit 33 may be taken out of the electric supplying holder 3 and may be replaced. In this embodiment, an accommodating space S2 and a hole H2 are formed between a first cover 31 and a second cover 32, and the flexible battery unit 33 passes through the hole H2 and is thus inserted into the accommodating space S2. Thus, when the electric power of the flexible battery unit 33 is used up, the flexible battery unit 33 may be taken out and replaced.

Figure 4:
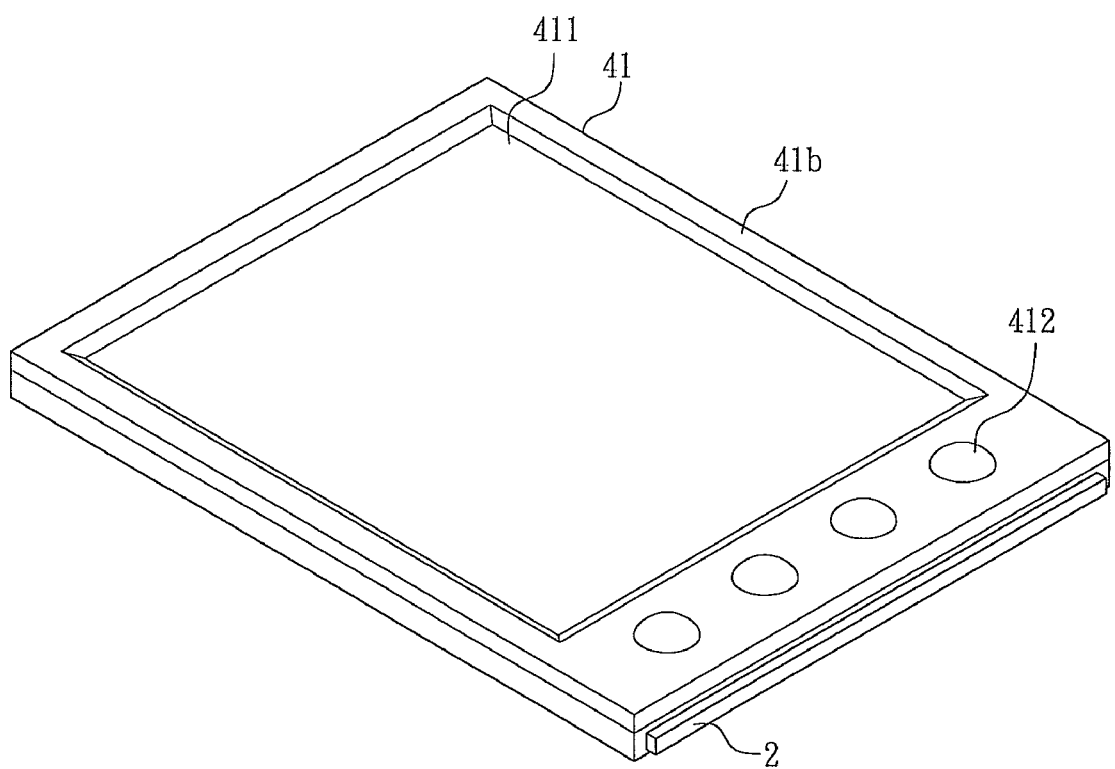
FIG. 4 shows an electric supplying holder according to still another embodiment of the invention.

FIG. 4 shows an electric supplying holder 4 according to still another embodiment of the invention. As shown in FIG. 4, a display element 411 can display the information stored in the data card 2. If the display element 411 is enlarged to have the size substantially the same as a second surface 41b of a first cover 41, the data card 2 with the readable information may be placed into the electric supplying holder 4 so that the electric supplying holder 4 of the invention functions as the electronic paper (e-paper). In addition, a control button 412 may function to turn over the page.

As mentioned hereinabove, the electric supplying holder according to the invention includes a holder and a flexible battery unit. The holder is used for accommodating a data card, so that the data card can obtain the electric power via the flexible battery unit electrically connected therewith. Thus, the data card can be converted from the passive information transmission (i.e., the data card has to be powered by the reader) into the active information transmission, and the sufficient electric power can lengthen the effective distance of the data card.

Compared with the prior art, when the data card is placed in the electric supplying holder of the invention, the flexible battery unit can supply the electric power to the data card so that the effective distance of the data card can be lengthened. Therefore, the user does not have to move the data card to approach the reader purposely for the identification by the reader, and the data card can be conveniently used. In addition, a control button is provided so that the user can select the data card to enter an active state or a passive state and thus to save the electric power of the electric supplying holder. Then, a display element is provided to display the information contained in the data card so that the function of the electric supplying holder of the invention becomes more complete and convenient. In addition, the flexible battery unit also may be self-charged or may be replaced with a new flexible battery unit to prevent the electric supplying holder of the invention from encountering the problem of the insufficient electric power.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electric supplying holder, comprising:
   a first cover;
   a second cover having at least one first contact point, wherein the first cover is disposed at a first side of the second cover;
   a flexible battery unit having at least one conducting part, wherein the flexible battery unit is placed between the first cover and the second cover, and the first contact point is electrically connected with the conducting part;
   a third cover disposed at a second side of the second cover, wherein a first accommodating space is formed between the second cover and the third cover, wherein the flexible battery unit has a first charge collecting layer, a first active material layer, an isolation lager, a second active material layer and a second charge collecting layer, which are sequentially disposed between the first cover and the second cover, the first charge collecting layer is formed on the first cover; and
   wherein the first cover, the second cover and the third cover are flexible.

2. The electric supplying holder according to claim 1, wherein the accommodating space is fit with a data card, a first hole is further formed between the second cover and the third cover, and the data card is disposed in the first accommodating space by passing through the first hole.

3. The electric supplying holder according to claim 2, wherein the data card has at least one second contact point electrically connected with the first contact point.

4. The electric supplying holder according to claim 2, wherein the data card is a radio frequency identification (RFID) element.

5. The electric supplying holder according to claim 1, wherein the second charge collecting layer is formed on the second cover.

6. The electric supplying holder according to claim 1, wherein the flexible battery unit further comprises a package element for encapsulating the first charge collecting layer, the first active material layer, the isolation layer, the second active material layer and the second charge collecting layer.

7. The electric supplying holder according to claim 1, wherein a second accommodating space and a second hole are formed between the first cover and the second cover, and the flexible battery unit is disposed in the second accommodating space by passing through the second hole.

8. The electric supplying holder according to claim 1, further comprising a display element disposed on the first cover and/or the third cover.

9. The electric supplying holder according to claim 8, wherein the display element is a liquid crystal display (LCD), a light-emitting diode (LED) panel or an organic light emitting diode (OLED) panel.

10. The electric supplying holder according to claim 1, further comprising a control button disposed on the first cover or the third cover.

11. The electric supplying holder according to claim 1, further comprising a wireless charging module connected with the flexible battery unit.

12. The electric supplying holder according to claim 11, wherein the wireless charging module comprises an antenna unit and a charge control unit.

* * * * *